United States Patent [19]

Ferriss

[11] 4,102,202
[45] Jul. 25, 1978

[54] ELECTROSTATIC ACCELEROMETER

[75] Inventor: Lincoln Stark Ferriss, Lincoln Park, N.J.

[73] Assignee: The Singer Company, Little Falls, N.J.

[21] Appl. No.: 745,259

[22] Filed: Nov. 26, 1976

[51] Int. Cl.² .............................................. G01P 15/00
[52] U.S. Cl. .................. 73/517 B; 318/648; 318/676
[58] Field of Search ............. 73/516 R, 517 R, 517 B; 318/648, 676

[56] References Cited

U.S. PATENT DOCUMENTS

| 3,151,486 | 10/1964 | Plummer | 73/517 B |
| 3,226,979 | 1/1966 | De Boice | 73/517 B |
| 3,229,530 | 1/1966 | Wilcox | 73/517 B |
| 3,438,267 | 4/1969 | Contensou et al. | 73/517 B |
| 3,891,285 | 6/1975 | Atkinson | 73/517 B X |
| 3,911,738 | 10/1975 | Fischer | 73/517 B X |

Primary Examiner—James J. Gill
Attorney, Agent, or Firm—L. A. Wright; T. W. Kennedy

[57] ABSTRACT

A digitally responsive electrostatic accelerometer having a pendulum pivotally movable about a hinge. A pair of torquer electrodes mounted on opposite sides of the pendulum are connected to a source of constant current. As the pendulum moves from its null position under the influence of acceleration forces, the displacement from null position is indicated by an increase in charge on the electrode which is in closer proximity to the pendulum. Electronic circuit means are provided to detect the direction of displacement of the pendulum from null and to apply a charge to the proper torquer electrode to force the pendulum back to null position. The principle of operation of the device is based upon the fact that the magnitude of the voltage on the torquer electrodes when charged from a constant current source contains information indicative of the position of the pendulum from null.

7 Claims, 4 Drawing Figures

EXCLUSIVE NOR LOGIC FUNCTION
"EITHER ALL OR NOTHING AT ALL"

TRUTH TABLE

| C | A | B |
|---|---|---|
| 1 | 0 | 0 |
| 0 | 0 | 1 |
| 0 | 1 | 0 |
| 1 | 1 | 1 |

$C = AB + \overline{A}\overline{B}$

LOGIC SYMBOL

THE COMPLEMENT OF THE EXCLUSIVE NOR FUNCTION IS THE EXCLUSIVE OR SOMETIMES IDENTIFIED BY E OR.
"ONE OR THE OTHER BUT NOT BOTH"

$A \oplus B = A\overline{B} + \overline{A}B = \overline{C}$

ELECTROSTATIC ACCELEROMETER

This invention is related to inertial measurement means. More particularly, this invention is related to an electrostatic accelerometer having identical means to restore a seismic mass to its null position and to identify the displacement of the seismic mass from its null position.

BACKGROUND OF THE INVENTION

The principle of force rebalancing is widely used in the field of instrumentation. For example, it is used in instruments measuring force or related quantities such as accelerometers. In the accelerometer, the suspended seismic mass is measured by an optical, mechanical, or electrical position sensor. The function of the position sensor is to detect any deviation of the mass from a reference point or null position and to provide signals to a drive means to exert a counter force on the mass to drive it back to the null position.

In U.S. Pat. No. 3,877,313, assigned to the same assignee as the present invention there is disclosed an accelerometer in which the displacement and restoration to null position of the seismic mass or pendulum is accomplished by the use of separately energized capacitive torquer plates for restoration to null and by use of a pair of pickoff plates to detect the displacement angle. Specifically, in the teaching of the above-identified patent, a pair of pickoff electrodes separate from the pair of torquer electrodes are required. Additionally, a source of sinusoidal excitation phase-locked at the sampling rate is required to be applied to an electrically separated portion of the pendulum. Moreover, pickoff amplifiers and a differential amplifier are required to process the pickoff signal.

One disadvantage of the described device is that separate pickoff electrodes are required which complicates the plating of the electrodes and requires two additional electrical connections to the accelerometer. Also, the area for the pickoff electrodes substracts from the total available area limiting the area available for the torquer electrodes.

Another disadvantage of the prior art is that the pendulum had to be a composite structure of non-conducting ceramic, plated in two distinct areas responsive to the torquer electrodes and pickoff excitation respectively. Since the hinged or "necked down" portion of the prior art pendulum is metallic, the composite structure requires two electrical connections to be made external to the accelerometer; one to each of the two plated areas.

A third disadvantage of the prior art is that a source of sinusoidal excitation is required to be applied to part of the pendulum opposite the pickoff electrodes. Additional electronics are required to generate the sinusoid. Moreover, this excitation, when applied to the pendulum, may produce undesired forces on the pendulum detracting from accelerometer performance.

BRIEF DESCRIPTION OF THE INVENTION

The electrostatic accelerometer of the present invention has advantages over the prior art in that there is no need for a pair of separate pickoff electrodes to detect the displacement of the pendulum from its null position. This is a unique feature of the present invention and it comes about because of the discovery that the magnitude of the voltage on the torquer electrodes when charged from a constant current source contains information indicative of the position of the pendulum. Therefore, a single pair of electrodes are used in the present invention for both position sensing and force rebalancing.

In addition, the present invention has the advantage that the pendulum is of a unitary structure and is conductive. This eliminates the problems of plating and electrical isolation of wiring and enhances the hinge structure. Finally, the elimination of the source of sinusoidal excitation removes the probability of undesired forces acting on the pendulum.

Accordingly, it is an object of this invention to provide an electrostatic accelerometer wherein the same torquer electrodes are employed both to detect the displacement of the seismic mass from its null position and to return the seismic mass to null.

It is another object of this invention to provide a conductive seismic mass or pendulum which has a unitary structure thus eliminating the need for a composite seismic mass.

These and other objects, features and advantages of the present invention will become apparent from the following description taken in conjunction with the accompanying drawings wherein.

Figure 1:
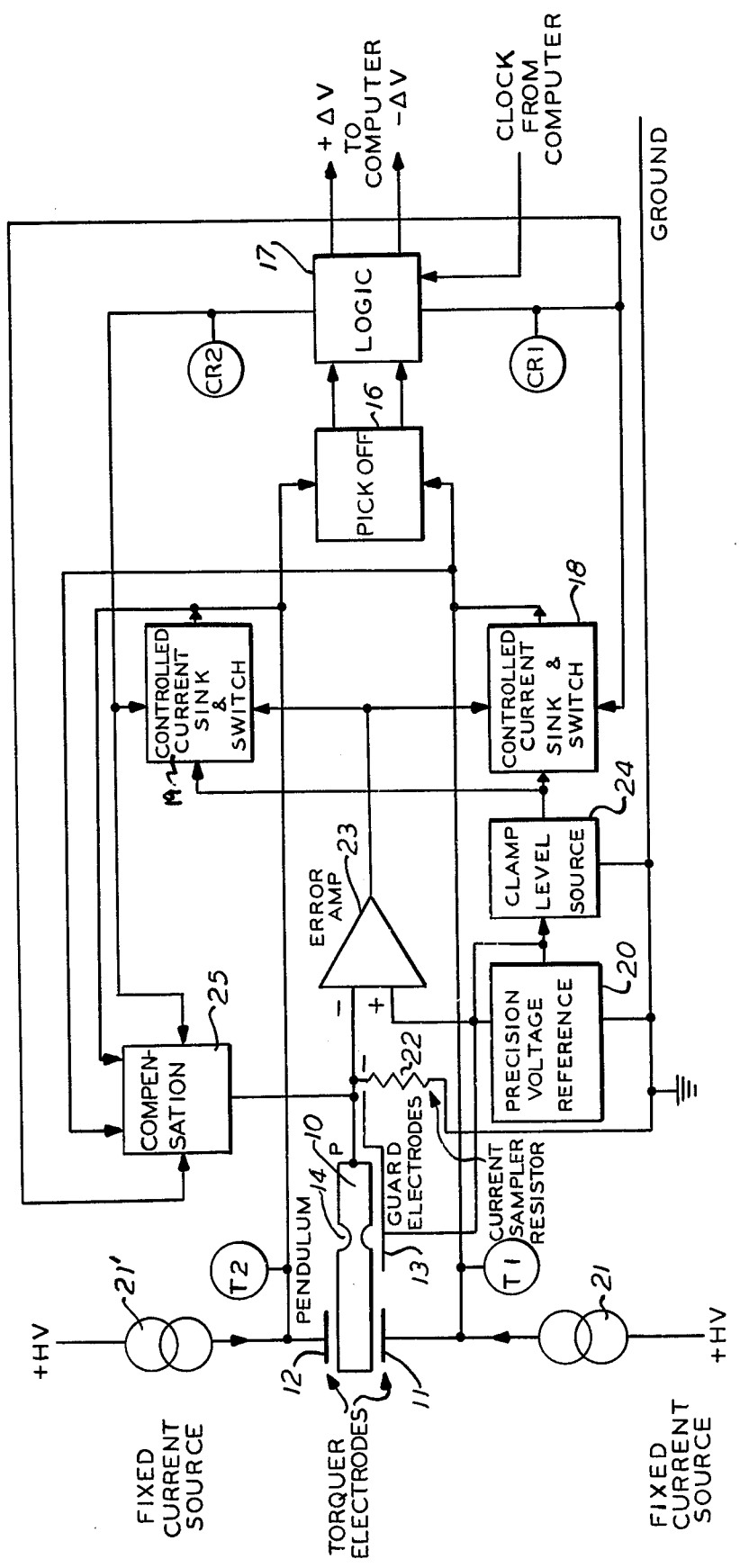
FIG. 1 is a block diagram of the electrostatic accelerometer of the invention.

Referring to FIG. 1, the accelerometer of the invention comprises four key elements enclosed in a casing or housing (not shown) and which interconnect to the electronics through external pins. The key elements are the pendulum 10, torquer electrodes 11, 12 and guard electrode 13. Externally applied acceleration acting through the pendulosity of pendulum 10 causes it to rotate about flexure center 14. The direction of rotation relative to the centered position of pendulum 10 is periodically determined at the sampling frequency by comparing attenuated potentials on torquer electrodes 11 and 12 with a reference potential in pickoff block 16. Based on whether the pendulum is closer to electrode 11 or 12, the logic block 17 selects the proper controlled current sink and switch (CCSS) 18 or 19 to be active during the next charging interval to cause the pendulum to be torqued toward null.

Just prior to the beginning of the charging interval, the previously active torquer electrode which has charged to a potential on the order of 400 V is discharged through the action of (CCSS) 18, 19, both of which are in the switch mode. During this initialization period, which lasts about 6 $\mu$sec, all elements of the accelerometer are brought to the potential of the precision voltage reference (PVR) 20 which is about 7 V d-c, and thus all elements are initialized to zero potential difference. At the beginning of the charging interval, logic block 17 releases (CCSS) 18 or 19 associated with the torquer electrode which is to be active from switch mode into the control mode, holding the other (CCSS) in the switch mode. Thus, one electrode begins to charge from the fixed current source (FCS) 21 or 21' associated with it. The charging path is through the active electrode-to-pendulum capacitance and through the current sample resistor (CSR) 22 to ground producing a voltage drop equal to the product of the electrode displacement current and the value of the (CSR). At the input terminals of the error amplifier (EA) 23, the magnitude of the voltage drop at the negative terminal is compared with the precision voltage reference at the positive terminal and the difference between the two inputs to the error amplifier 23 is zero. In this manner, the electrode displacement current is maintained constant and equal to the value of the precision voltage reference divided by the value of the (CSR). Since both the precision voltage reference and (CSR) are very stable with temperature and time, the electrode displacement current also remains quite constant.

It is important that only active electrode displacement current flow in the (CSR). In the design of the instrument, this condition requires a great degree of isolation between the conductors leading to electrodes 11 and 12 and those leading to pendulum 10.

Effective isolation cannot be achieved here by separation alone and therefore very effective shielding and guarding must be employed. Within the instrument guarding electrode 13 maintained at the precision voltage reference potential must be utilized. Since the inactive electrode 10 and 13 are all maintained at equal potential, no current flows between them. It is in this manner that the current leaving pendulum 10 is in fact the displacement current alone.

Likewise, in the electronics, similar techniques must be employed. It would be desirable to locate that part of the circuitry associated with the conductor connected to pendulum 10 close to or as a part of the instrument and keep it well shielded from the remaining circuitry.

As the active electrode 11 charges, the voltage on the electrode rises in a ramp-like manner. If pendulum 10 were constrained mechanically in the null position, the voltage on the electrode would rise in a perfect ramp shape having a constant slope, to a peak value just before the beginning of the initialization interval. Since the pendulum moves and therefore changes the capacitance associated with the active electrode, the peak electrode voltage will rise to a value less than (for 10 closer to 11) or greater (10 further from 11) that which would be reached were pendulum 10 held at null.

The pickoff block 16 utilizes the magnitude of the torquer electrode voltage to determine which side of null pendulum 10 is on. This information is fed to logic block 17 which selects the electrode to be active during the next charging interval. Logic block 17 also outputs velocity increment pulses ($\pm \Delta$) to the computer (not shown), and receives accurately timed clock pulses from the computer which determines the duration of the initialization interval (time when clock pulse is high) and the charging interval (time when clock pulse is low).

The clamp level source 24 elevates the precision voltage reference 20 by one forward-biased diode voltage drop. In initializing electrodes 11 and 12, series feed diodes connected to the clamp level source 24 are used such that the total torquer electrode initialization potential is equal to that of precision voltage reference 20 alone.

The compensation block 25 provides a means for electronically introducing compensatory currents into the control loop.

Figure 2:
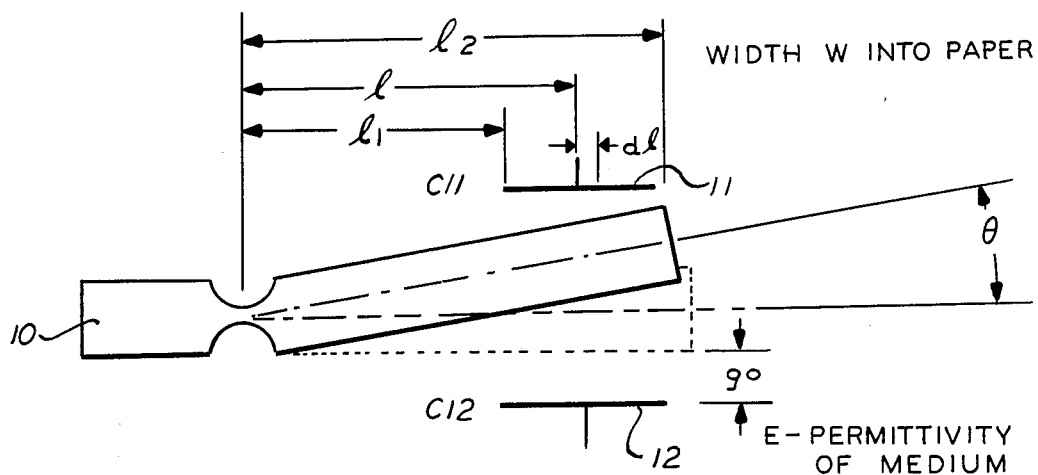
FIG. 2 is a simplified schematic in cross section of the pendulum and electrodes.

Turning now to FIG. 2, which is a simplified sketch showing the cross section of pendulum 10 and electrodes 11 and 12, the physical principle utilized in this invention is that for a constant charge Q, the voltage V across a capacitor C varies inversely as the capacitance. That is, $$V = (Q/C) \tag{1}$$

In the case of the electrostatic accelerometer pickoff, torquer electrode 11 or 12 are one plate of a variable capacitance, the other plate being the pendulum 10. The separating dielectric medium is the vacuum or fluid separating them. This capacitance varies in magnitude as the spacing between pendulum 10 and the electrode changes by virtue of motion of pendulum 10 responding to inertial and electrostatic forces. The charge accrues with time as a result of placing a current source in series with this capacitor.

Elemental strips of capacitance $dC_{11}$ and $dC_{12}$ can be constructed and written as:

$$dC_{11} = \frac{\epsilon \omega dl}{g_0 - l\sin\theta} \tag{2a}$$

$$dC_{12} = \frac{\epsilon \omega dl}{g_0 + l\sin\theta} \tag{2b}$$

By integrating between the limits $l_1$ and $l_2$ the capacitances $C_{11}$ and $C_{12}$ are:

$$C_{11} = -\frac{\epsilon\omega}{\sin\theta} [\ln(g_o - l_2\sin\theta) - \ln(g_o - l_1\sin\theta)] \tag{3a}$$

$$C_{12} = \frac{\epsilon\omega}{\sin\theta} [\ln(g_o + l_2\sin\theta) - \ln(g_o + l_1\sin\theta)] \tag{3b}$$

These are the exact expressions for electrode-pendulum capacitance neglecting fringing and are rewritten:

$$C_{11} = -\frac{\epsilon\omega}{\sin\theta} \left[ \ln \frac{(g_o - l_2\sin\theta)}{(g_o - l_1\sin\theta)} \right] \tag{4a}$$

$$C_{12} = \frac{\epsilon\omega}{\sin\theta} \left[ \ln \frac{(g_o + l_2\sin\theta)}{(g_o + l_1\sin\theta)} \right] \tag{4b}$$

and performing the divisions indicated in (4a) and (4b) one obtains:

$$C_{11} = -\frac{\epsilon\omega}{\sin\theta} \left[ \ln 1 - \frac{\frac{L\sin\theta}{g_o}}{1 - \frac{l_1\sin\theta}{g_o}} \right] \tag{5a}$$

$$C_{12} = \frac{\epsilon\omega}{\sin\theta} \left[ \ln 1 + \frac{\frac{L\sin\theta}{g_o}}{1 + \frac{l_1\sin\theta}{g_o}} \right] \tag{5b}$$

Where $L = l_2 - l_1$

Using the first-order term of the expansion $$\ln(1 + x) = x - \frac{x^2}{2} + \frac{x^3}{3} - \tag{6}$$

$$C_{11} = \frac{\epsilon\omega L}{g_o} \left( \frac{1}{1 - \frac{l_1\sin\theta}{g_o}} \right) \tag{7a}$$

-continued $$C_{12} = \frac{\epsilon \omega L}{g_o} \left( \frac{1}{1 + \frac{l_1 \sin\theta}{g_o}} \right) \quad (7b)$$

The term ($\epsilon \omega L/g_o$) is the value of capacitance which would exist if $\theta = 0$. Further, there is a limiting angle $\theta_F$ which would prevent any further excursion of the pendulum. The sine of this angle $\theta_F$ is approximately equal to ($g_o/l_1$). Substituting $l_1 \sin\theta_F = g_o$ and ($\epsilon \omega L/g_o$) = $C_o$, and further using the small angle assumption:

$$C_{11} = \frac{C_o}{1 - \frac{\theta}{\theta_F}} \quad (8a)$$

$$C_{12} = \frac{C_o}{1 + \frac{\theta}{\theta_F}} \quad (8b)$$

By the action of the force rebalance current-control loop a charging current I = ($V_R/R_S$) is established in either $C_{11}$ or $C_{12}$ for a fixed period $T_s$.

At the end of the charging interval, the active electrode will have a potential with respect to the pendulum given by $$V = (IT_s/C) \quad (9)$$

where $IT_s = Q$ is the charge accumulated over the interval. Where $C_{11}$ active, $$V_{11} = \frac{Q}{C_o} \left[ 1 - \frac{\theta}{\theta_F} \right] \quad (10a)$$

and $C_{12}$ active, $$V_{12} = \frac{Q}{C_o} \left[ 1 + \frac{\theta}{\theta_F} \right] \quad (10b)$$

Note the term ($Q/C_o$) is the magnitude of the voltage which would have accrued were the pendulum held in the null position. Substituting ($Q/C_o$) = $V_o$ $$V_{11} = V_o \left[ 1 - \frac{\theta}{\theta_F} \right] \quad (11a)$$

$$V_{12} = V_o \left[ 1 + \frac{\theta}{\theta_F} \right] \quad (11b)$$

Differentiating $V_{11}$ and $V_{12}$ with respect to $\theta$, $$\frac{dV_{11}}{d\theta} = - \frac{V_o}{\theta_F} \quad (12a)$$

$$\frac{dV_{12}}{d\theta} = - \frac{V_o}{\theta_F} \quad (12b)$$

These expressions are the scale factor of the pickoff.

By comparing the magnitude of $V_{11}$ or $V_{12}$ (or an attenuated magnitude as in the practical reduction of this principle to practice) with $V_o$ (or an attenuated magnitude thereof), the position of the pendulum, both in magnitude and direction, is thus determined.

Figure 3:
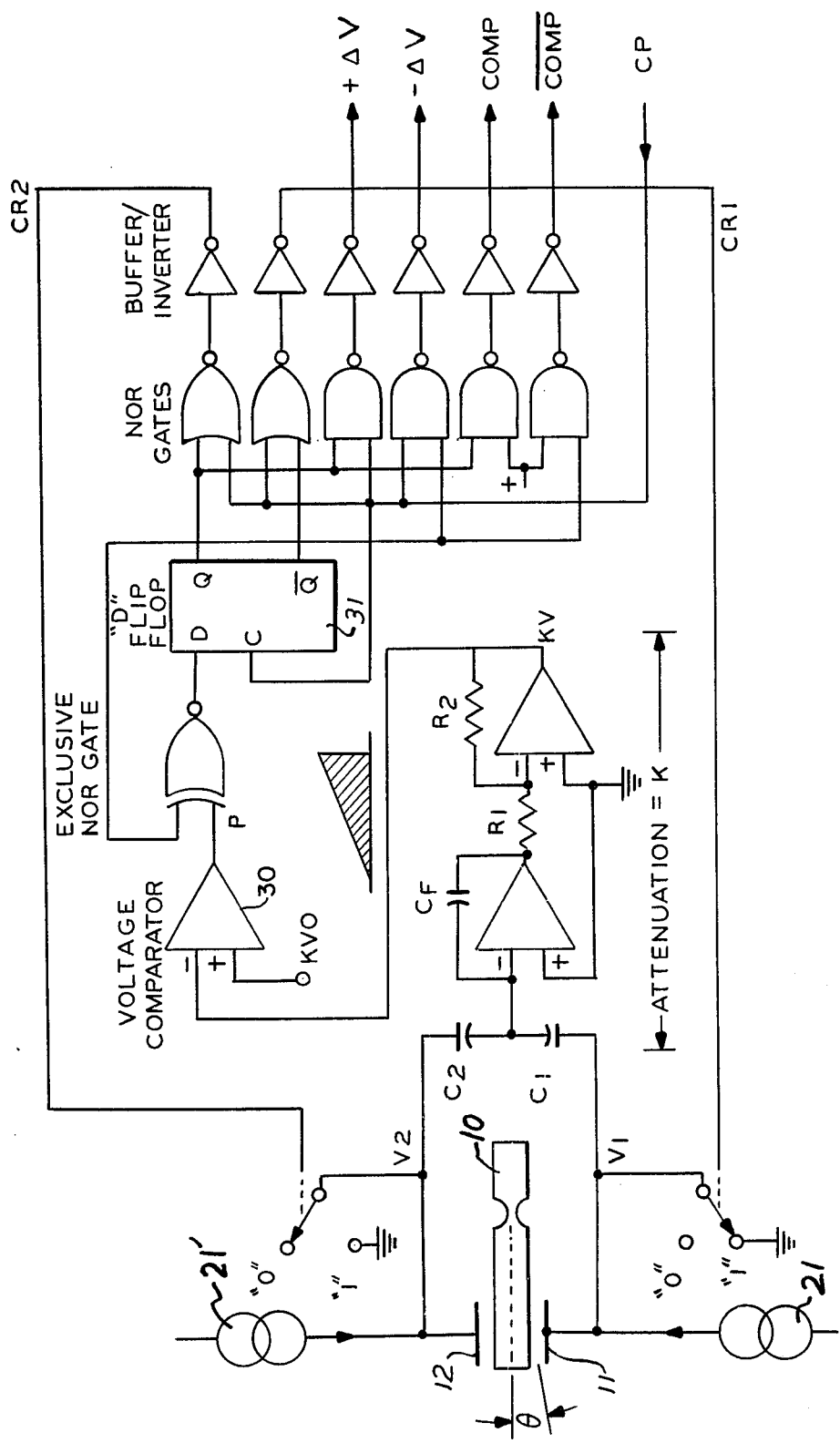
FIG. 3 is a schematic block diagram of the pickoff and logic circuits of the accelerometer of the invention.

Referring to FIG. 3, it is seen that logic levels CR2 and CR1 control the activity of electrodes 11 and 12. For the positions of the switches shown in FIG. 3, CR2 is low and electrode 12 is active, charging C2 from current source 21'. CR1 is high placing a ground on electrode 11 shorting current source 21, thus preventing C1 from charging.

The states of CR2 and CR1 are determined by the states of CP and Q of flip-flop 31, as written in equation 13a and 13b.

$$CR2 = Q + CP \quad (13a)$$

$$CR1 = \overline{Q} + CP \quad (13b)$$

Examining these logic equations, it is evident that CP = 0 (charging interval) the states of CR2 and CR1 are determined by the state of Q; when Q = 1, electrode 11 is active and when Q = 0, electrode 12 is active. During the initialization interval (CP = 1), both CR2 and CR1 are high, independent of the state of Q.

There are four possible conditions which could be present at the end of a charging interval as indicated in Table 1.

TABLE I

| | | STATE CONDITIONS | |
|---|---|---|---|
| | | ELECTRODE ACTIVE | ELECTRODE ACTIVITY |
| CASE | $\theta$ | THIS PERIOD | DESIRED NEXT PERIOD |
| I | $\leq 0$ | 11 | 11 |
| II | $> 0$ | 11 | 12 |
| III | $\leq 0$ | 12 | 11 |
| IV | $> 0$ | 12 | 12 |

The table also includes the electrode to be active during the next charging interval to meet the requirement that the pendulum always be torqued toward null.

The voltage output $kV$ is an attenuated replica of the voltage appearing on electrode 11 or electrode 12, whichever is active. The attenuation factor $k$ is given by:

$$k_1 = (C_1 R_2 / C_F R_1) \quad (14a)$$

$$k_2 = (C_2 R_2 / C_F R_1) \quad (14b)$$

The magnitude of $k$ is about 0.01 resulting in a sawtooth voltage waveform having a peak amplitude of about 4V. The sawtooth is compared with a d-c voltage having a value $kV_o$ where $V_o$ is the peak value to which either electrode voltage would rise were the pendulum clamped in the null position ($\theta = 0$).

The output of comparator 30 is a logic level P which is a logic level "1" as long as the input $kV$ is less than the reference voltage $kV_o$ which is applied to the non-inverting input. The input $kV$ is less than the reference $kV_o$ when pendulum 10 is closer to the electrode which is active than the one which is grounded. That is, $$P = Q\theta + \overline{Q}\overline{\theta} \quad (15a)$$

and the complement $$\overline{P} = \overline{Q}\theta + Q\overline{\theta} \quad (15b)$$

where $\theta$ is redefined as logic variable which is "1" for $\theta > 0$ and "0" for $\theta \leq 0$. That is, $$\theta = \text{"1" for } \theta > 0 \quad (16a)$$

$$\theta = \text{"0" for } \theta \leq 0 \quad (16b)$$

The desired action for the next charging interval is to always torque pendulum 10 toward null. The proper logic level must be present at the "D" input for flip-flop 31 prior to receipt of the clock pulse CP which transfers that logic level to the Q output. The desired (required) action can thus be simply stated by:

For $\theta = 0, D = 1$ (17a)

$\theta = 1, D = 0$ (17b)

Figure 4:
FIG. 4 is a truth table showing the logic switching function.

Now consider the exclusive NOR function, a truth table for which is shown in FIG. 4.

Writing the expression for D in terms of $\bar{P}$ and Q, from FIG. 3, $$D = P\bar{Q} + \bar{P}Q \quad (18)$$

Substituting for P and $\bar{P}$ using equations 15a and 15b $$D = (Q\theta + \bar{Q}\bar{\theta})\bar{Q} + (\bar{Q}\theta + Q\bar{\theta})Q = \bar{Q}\bar{\theta} + Q$$
$$\bar{\theta} = (\bar{Q} + Q)\bar{\theta} = \bar{\theta}$$

which is that required by equation 17.

Common mode errors for this circuit configuration should be small since signal flow is through common elements except C1 and C2 (FIG. 3) which are stable NPO capacitors. The junction of C1 and C2 is at a virtual ground point such that strays to ground do not interfere with the gain stability of k.

Velocity increment output pulses ($\pm \Delta V$) are generated by gating the flip-flop outputs with the clock pulse.

Another output pair (COMP and $\overline{COMP}$) is the buffered flip-flop output to be used for steering compensation into the current sample resistor network and also for variation of the comparator reference level $kVo$ so as to produce an average zero pendulum position under load.

From the foregoing, an electrostatic accelerometer, based upon the principle that the magnitude of the voltage on the torquer electrodes, when charged from a constant current source, contains information indicative of the position of the pendulum from null and which combines the functions of pickoff and torquing has been described. Although the utilization of the device has been described in the environment of an electrostatic accelerometer, it is obvious that the instrument could be used in other applications. Therefore, it is intended in the following claims to cover the embodiments which fall within the true spirit and scope of the invention.

What is claimed is:

1. An electrostatic accelerometer comprising:
   a conductive pendulous mass pivotally movable about a hinge point said pendulous mass being responsive to acceleration along a sensing axis,
   first and second electrodes disposed on the opposite sides of said pendulous mass and in capacitive relation therewith,
   sources of constant current connected to said electrodes for building up a charge on said electrodes to enable said electrodes to force said pendulous mass to its null position, said charge on said electrodes being indicative of the position and direction of said pendulous mass from null,
   a high gain differential amplifier said pendulous mass connected to a first input of said amplifier,
   a source of reference voltage connected to a second input of said amplifier,
   a resistance means connected between ground and said first amplifier input whereby said amplifier is capable of maintaining a zero potential difference between said first and second amplifier inputs through action of said constant current sources connected as control loops, and
   means responsive to said charge on said electrodes for measuring the position and direction of displacement of said pendulous mass from null position.

2. The electrostatic accelerometer of claim 1 comprising:
   means for periodically comparing the potentials on said capacitive electrodes with a reference potential for determining the direction of the displacement of said pendulous mass from null position.

3. The electrostatic accelerometer of claim 2 comprising:
   means responsive to said comparing means for selecting the capacitive electrode to be charged to force said pendulous mass toward null position.

4. The electrostatic accelerometer of claim 3 comprising:
   means for establishing a first period for bringing all electrical elements of said electrostatic accelerometer to a reference potential and for establishing a second period for charging said selected capacitive electrode to force said pendulous mass back to null position.

5. A force measuring instrument comprising:
   a gas tight enclosure,
   a conductive pendulum having a unitary structure contained within said enclosure said pendulum mounted to allow pivotal movement about a null position,
   a pair of conductive electrodes mounted on opposite sides of said pendulum,
   a guard electrode having a voltage potential equal to the potential on said pendulum for shielding said pendulum from stray signals,
   a source of constant current applied to said conductive electrodes,
   a pickoff circuit for comparing the charge on each of said conductive electrodes with a reference potential and for determining the direction from null of said pendulum,
   a voltage comparator having a first input connected to the junction of a pair of capacitors each respectively connected to said conductive electrodes and a second input to a reference potential said voltage comparator providing an output signal indicative of the amplitude of the displacement of said pendulum from said null position, and
   logic means for selecting the conductive electrode to be charged for bringing said pendulum back to null position.

6. The instrument of claim 5 comprising:
   a flexure hinge on said pendulum for permitting pivotal movement about said null position.

7. An electrostatic accelerometer comprising:
   a conductive pendulous mass pivotally movable about a hinge point said pendulous mass being responsive to acceleration along a sensing axis,
   first and second electrodes disposed on the opposite sides of said pendulous mass and in capacitive relation therewith,
   sources of constant current connected to said electrodes for building up a charge on said electrodes to enable said electrodes to force said pendulous mass to its null position said charge on said electrodes being indicative of the position and direction of said pendulous mass from null, and
   means responsive to said charge on said electrodes for measuring said position and direction of displacement of said pendulous mass from null position.

* * * * *